United States Patent Office 3,215,234
Patented Nov. 2, 1965

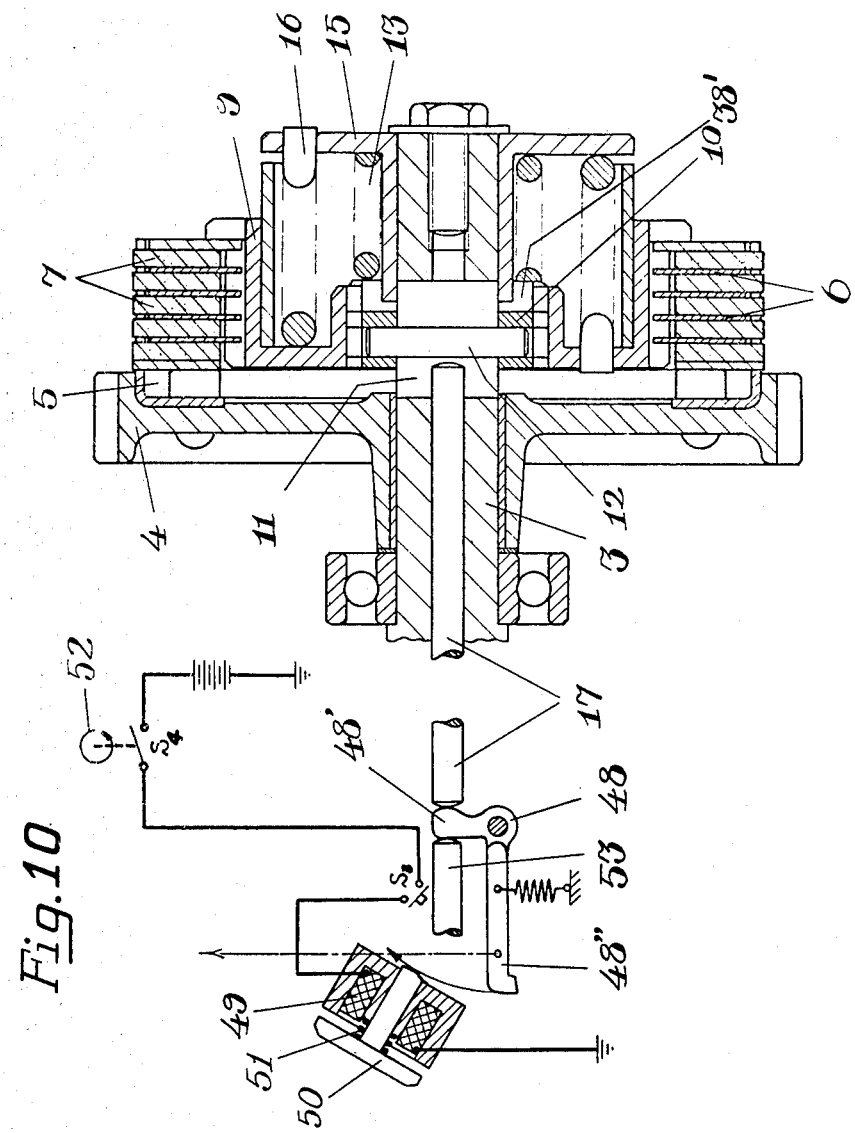

3,215,234
AUTOMATIC CLUTCH
Bunzo Hirano, 539 Nishinoshima, Toyotamura,
Iwata-gun, Shizuoka-prefecture, Japan
Filed Feb. 12, 1962, Ser. No. 172,395
Claims priority, application Japan, Feb. 27, 1961, 36/
6,693; Feb. 28, 1961, 36/7,236; Mar. 14, 1961, 36/
8,835; May 19, 1961, 36/17,767, 36/17,768; July 7,
1961, 36/24,542; Aug. 21, 1961, 36/30,257; Aug. 24,
1961, 36/30,691, 36/30,692
11 Claims. (Cl. 192—56)

This invention relates to automatic clutches and, more particularly, to a new and improved clutch which automatically regulates the power transmitted from an internal combustion engine to a driven load in accordance with the output power of the engine and the retardation forces acting on the driven load.

The power output of an internal combustion engine is substantially proportional to its rotational speed. When a vehicle, such as an automobile or a motorcycle, powered by an internal combustion engine, is operating along a relatively level roadway, the retardation forces acting on the vehicle are substantially proportional to the vehicle velocity. However, when the vehicle is being started from standstill, the retardation forces opposing acceleration are so large that, if the internal combustion engine is directly coupled to the driven wheels of the vehicle, the engine will stall. Accordingly, unless the engine has a considerable power capacity, acceleration of the vehicle from standstill will be at a relatively small rate. Even with internal combustion engines having a high power capacity, the engine frequently will stall, during starting of the vehicle, as the result of the disproportionately high forces resisting acceleration.

For this reason, vehicles powered by internal combustion engines generally have a transmission and a clutch. The transmission is used to increase the torque applied to the driven wheels of the vehicle, while the clutch is used to apply the torque gradually to the driven wheels after the engine is operating at a predetermined r.p.m.

In one known arrangement, a centrifugal clutch is employed which, after a predetermined engine r.p.m. has been attained, automatically operates to gradually increase the torque applied to the driven wheels of the vehicle. However, this arrangement is not satisfactory because of the varying operating conditions, such as grade and load, which the vehicle encounters. It is not practical, when the vehicle is climbing a grade or is carrying a heavy load, to begin to engage the clutch at the same fixed engine r.p.m. that such engagement would be effected if the vehicle were running with substantially no load on a level road. Furthermore, quick starting will also be influenced by the resistance due to acceleration. Consequently, with this type of centrifugal clutch, only a fixed acceleration rate can be obtained.

In practice, the only feasible clutch is one which, with higher loads or with quicker acceleration, will not connect the engine to the driven wheels until the engine r.p.m. is correspondingly increased. Various arrangements of this type of operation have been proposed, but all are characterized by undue complexity, are effective only during starting, and are ineffective during acceleration occurring after the clutch has been completely engaged. In effect, after the clutch is once engaged, the engine is directly connected with the driven wheels and therefore the torque transmitted by the clutch to the wheels is dependent upon the acceleration of the engine. Thus, the acceleration of the vehicle is restricted by the acceleration of the engine.

The present invention is based upon the premise that the clutch should operate to reduce the torque transmitted to the vehicle wheels in accordance with the load and a acceleration resistance of the vehicle, or driven member, and independently of the r.p.m. of the engine. Thus, when the load or acceleration resistance increases, the clutch will be disengaged so that the engine can be accelerated at low loads. When the engine reaches a higher r.p.m., corresponding to the increased load or acceleration resistance, the clutch will be re-engaged.

In accordance with the invention, the pressure tending to maintain the clutch completely engaged is reduced upon an increase in load resistance or acceleration resistance. As a further feature, initial engagement of the clutch is effected only after the engine has attained a predetermined r.p.m., as by the utilization of centrifugal force means.

Stated briefly, the primary feature of the present invention is to provide a clutch for connecting an internal combustion engine to a load, such as vehicle wheels, and in which engagement of the clutch is controlled not only by the r.p.m. of the engine but also by variations in load resistance and variations in acceleration resistance. The clutch is operable, upon an increase in load or acceleration resistance, to disconnect the engine from the vehicle wheels so that the engine may accelerate under low load and, when a higher engine r.p.m. has been atained, the clutch will reconnect the internal combustion engine to the vehicle wheels.

According to another feature of the invention, better acceleration performance is effected by enabling the load to be accelerated stepwise.

Still another feature of the invention is the provision of an automatic clutch of relatively simple construction and which is easily adapted for being coupled, for control, with the speed change lever and gear ratio converters employed in vehicles.

For an understanding of the principles of the invention, reference is made to the following description of typical embodiments thereof as illustrated in the accompanying drawings.

In the drawings:
FIG. 1 is an axial sectional view through one form of automatic clutch assembly embodying the invention;
FIG. 2 is an axial sectional view through another form of automatic clutch assembly embodying the invention;
FIG. 3 is an axial sectional view through one form of clutch per se embodying the invention;
FIG. 4 is an axial sectional view through another form of clutch per se embodying the invention;
FIG. 5 is an axial sectional view through still another form of automatic clutch per se embodying the invention;
FIG. 6 is an elevation view of throttle mechanism which may be used to control operation of the clutch mechanism;
FIG. 7 is a somewhat schematic diagram of electromagnetic means for controlling operation of the clutch assembly;
FIG. 8 is an axial sectional view through another form of clutch per se embodying the invention;
FIG. 9 is an axial sectional view through a speed responsive clutch controlling the clutch assembly;
FIG. 10 is partly an axial sectional view and partly a schematic wiring diagram illustrating an electromagnetic control for maintaining the clutch disengaged until the engine has attained a predetermined r.p.m.
FIG. 11 is an axial sectional view through another form of clutch per se embodying the invention;
FIG. 12 is an axial sectional view through still another form of clutch per se embodying the invention;

In the following description, a clutch embodying the invention will be described as used, for example, to connect the internal combustion engine of a motorcycle to the drive wheel thereof. However, it should be understood that the invention is not limited thereto, but such practical illustration has been selected merely by way of example.

Figure 1:
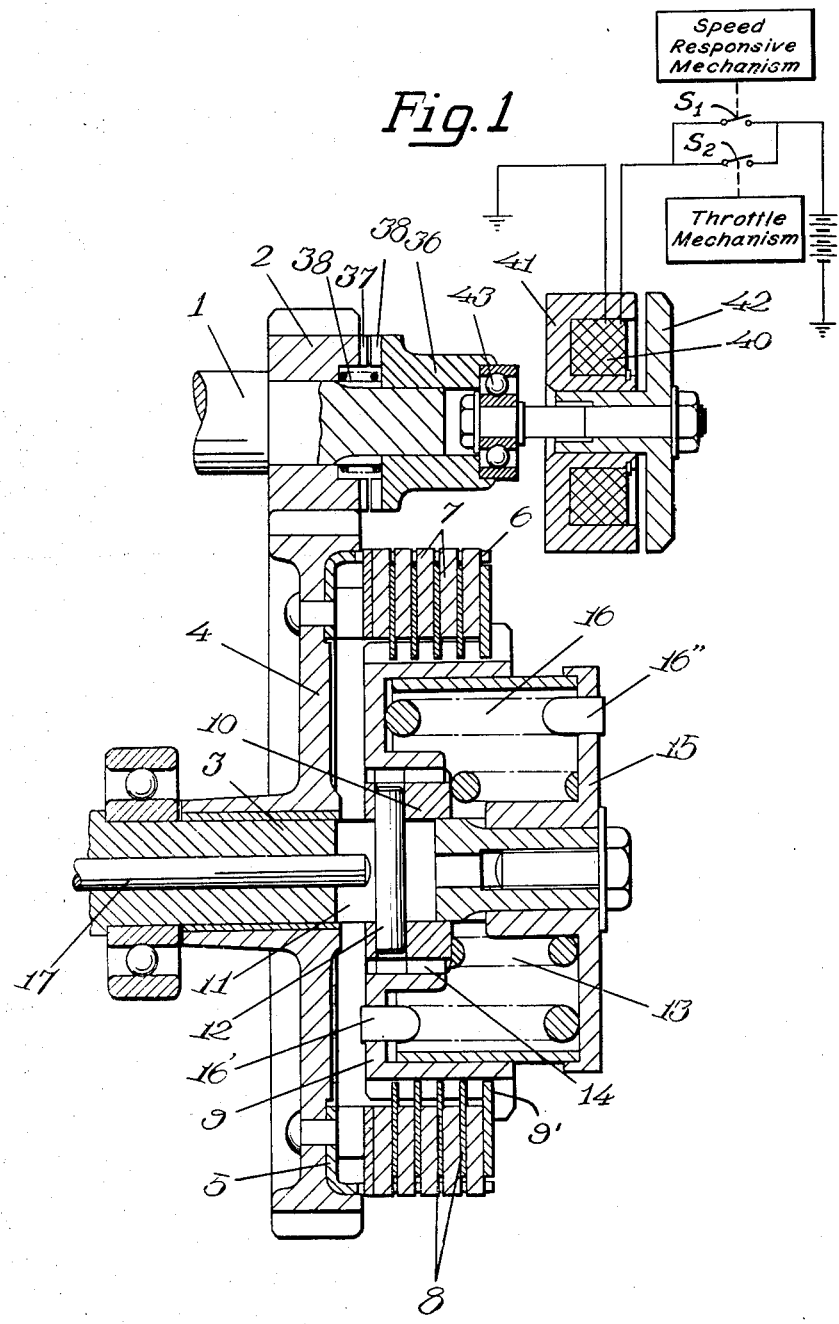

Referring to FIG. 1, the output shaft 1 of the internal combustion engine is formed with a reduced extension on which there is rotatably mounted a pinion 2 which is free to rotate with respect to shaft 1. A counter shaft or output shaft 3 is provided for connection to the driving wheel or wheels of the vehicle, as through a suitable transmission. A driving gear 4 is rotatably mounted on shaft 3 and is continually in mesh with pinion 2. Connection of driving gear 4 to shaft 2, or disconnection of driving gear 4 from shaft 2, is controlled by the automatic clutch of the invention, which is contained generally within a housing 5 rivetted or otherwise secured to driving gear 4.

The automatic clutch comprises driving disks 7, arranged to be rotated with gear 4 and interleaved with driven disks 8 arranged to rotate with shaft 3. For example, driving disks 7 may be mounted to rotate with housing 5, and to be axially displaceable relative thereto, as by having teeth engaged in slots or splines 6 extending axially of housing 5. Similarly, the inner peripheries of driven disks 8 are formed with teeth or the like which engage in axially extending grooves or splines 9' in a sleeve type hub 9 coaxial with shaft 3. Thus, driven disks 8 are likewise axially displaceable of hub 9, while being constrained to rotate therewith.

Hub 9 has an axial bore which surrounds a screw member 10 secured to rotate with shaft 2 while being displaceable axially of this shaft. For example, shaft 3 may be formed with a diametrically extending slot 11 through which there extends a pin 12 secured diametrically of screw member 10. The bore of hub 9 and the external surface of screw member 10 are provided with intermeshing threads 14, and member 10 is biased to the left, as viewed in FIG. 1, by a tensioned compression spring 13 engaged between member 10 and a cover plate 15 secured to the end of shaft 3 and constrained to rotate with shaft 3 as by having splined engagement therewith as illustrated. A torsion spring 16 has one end 16' secured to hub 9 to rotate therewith and a second end 16" secured to plate 15 to rotate therewith. Torsion spring 16 could also perform the function of compression spring 13.

With respect to the parts so far described, the torque of drive gear 4 will be transmitted to hub 9 through clutch plates 7 and 8, and from hub 9 to shaft 3 through torsion drive spring 16. If there is a retarding force exerted on shaft 3, drive spring 16 will be correspondingly twisted and hub 9 will be displaced angularly and axially relative to plate 15. Such angular displacement will occur in the driving direction, and hub 9, by virtue of the axial displacement of driven disks 8, will reduce the pressure between disks 7 and 8 and thus reduce or interrupt the torque transmitted by driving gear 4 to shaft 3. The larger the retarding force on shaft 3, the less will be the pressure applied to clutch disks 7 and 8. When there is no retarding force exerted on shaft 3, the plates 7 and 8 will be pressed into firm engagement by spring 16.

For example, if the engine is running and the vehicle is accelerated, the retarding force due to acceleration will act on shaft 3 and the clutch plates 7 and 8 will be disengaged. With the clutch disengaged, the engine can accelerate rapidly under low load conditions so that the engine output is quickly increased. As such higher output will be transmitted as an accelerating force by the subsequent re-engagement of the automatic clutch, acceleration of the vehicle can be expedited.

As the torque transmitted from the engine is applied to overcome the retarding force, it could be assumed that there may be an oscillatory action wherein the clutch will be engaged and disengaged intermittently. However, this does not occur in practice. The automatic clutch will act immediately to balance the engine power output, the transmitted torque and the retarding force. The retarding force due to acceleration will decrease with the degree of acceleration, and the value of the transmitted torque will increase. Thus, the acceleration will take place first and then increased acceleration of the vehicle will follow because of the higher engine output.

A clutch control lever is provided in the form of a push rod 17 which extends slidably through an axial bore in output shaft 3, and which has an inner end normally spaced somewhat from key or pin 12. If push rod 17 is displaced to the right to engage pin 12, then the aforementioned relative axial displacement of hub 9 relative to plate 15 by springs 16 and in a direction to firmly engage the clutch disks 7 and 8 will be prevented. However, there is one factor which should be noted with respect to the above-described operation of the clutch. At a constant velocity of the vehicle, there is a constant retarding force which is proportional to the velocity. Thus, a certain amount of power is required to maintain the velocity of the vehicle at a constant value. This constant retarding force will tend to cause spring 16 to decrease the pressure maintaining engagement between the clutch disks 7 and 8. Consequently, the torque transmitted by the clutch will decrease in proportion to the vehicle speed. However, the invention automatic clutch is designed to prevent this effect from occurring.

Screw member 10 is axially displaceable along shaft 3 and, if it can move freely in an axial direction, the relative rotation of hub 9 and screw member 10, by virtue of the interengaged threads 14 and under the force of spring 16, will occur as an axial displacement of screw member 10 rather than an axial displacement of hub 9. Thus, screw member 10 will be displaced in the pressing direction, of to the left in FIG. 1, and the pressure on the clutch plates, as exerted by spring 13, will not be varied as the vehicle velocity is changed. It is only when such displacement of screw member 10 to the left by spring 13 is prevented by push rod 17 that the clutch will be disengaged. By proper design of the parts, the axial displacement of screw member 10 by spring 13 can be made to balance the axial displacement tended to be exerted by drive spring 16. It is highly desirable that this balancing effect be such that it takes into consideration varying road conditions, such as varying grades, as well as a safety factor. Arrangements for effecting this will be described hereinafter.

It is desirable that the engine be free of connected load during starting of the engine, and FIG. 1 illustrates one arrangement whereby this may be effected. A clutch member 36 is splined to the reduced section of engine output shaft 1 so that it is fixed to rotate with shaft 1. Interengageable teeth 37 and 38 are provided on the facing surfaces of pinion 2 and clutch member 36, and pinion 2 and clutch member 36 are normally biased axially away from each other, to disengage teeth 37 and 38, by a spring 39. Interengagement of pinion 2 and clutch member 36 is effected electromagnetically. Thus, an energizing coil or winding 40 is provided in a magnetic structure 41 and, when coil 40 is energized, a magnetic armature 42 is attracted into firm engagement with structure 41. Armature 42 is formed as a thrust member which, through antifriction bearings 43, is connected for conjoint axial movement with clutch member 36. Accordingly, as coil 40 is energized, clutch member 36 is moved to the left to interengage teeth 37 and 38 and thus effectively connect pinion 2 to engine output shaft 1 for driving of the vehicle. Through the constant intermeshing of pinion 2 and drive gear 4, drive gear 4 will now be driven from engine output shaft 1.

Energization of coil or winding 40 is effected under the control of switches S₁ and S₂. These switches are closed only when the engine speed attains a preselected r.p.m. For example, switch S₁ may be operated by a suitable speed responsive mechanism, such as a centrifugal mechanism, and switch S₂ can be connected with the throttle controlling the speed of the engine. The engine speed at which either of the switches S₁ or S₂ is closed is so selected that spring 16 will operate to disengage the clutch, or at least to reduce the pressure on the clutch plates, so that no starting shock is transmitted to driven shaft 3. Thus, the starting torque is absorbed by drive gear 4 and the masses of clutch housing 5 and disk 7, with the spring 16 absorbing the starting shock.

Figure 2:
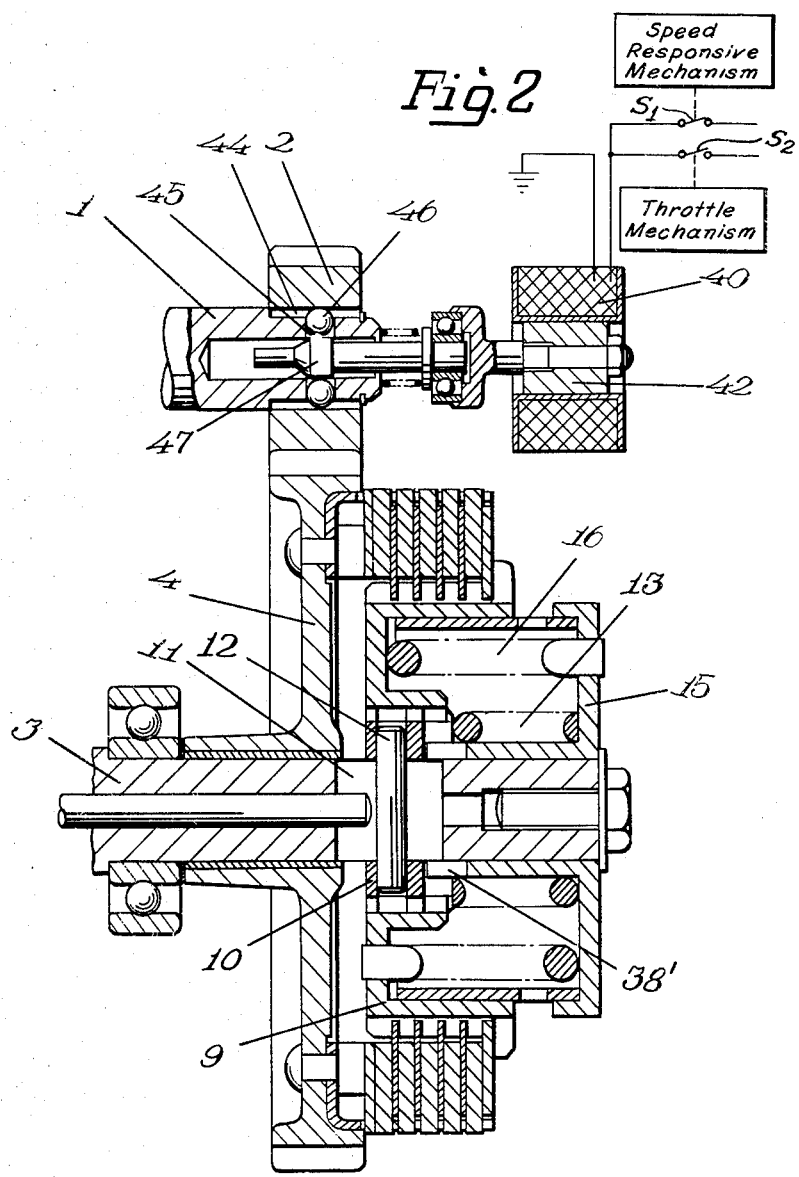

The embodiment of the clutch shown in FIG. 2 is essentially similar to that shown in FIG. 1. In FIG. 2, however, plate 15 is secured against axial displacement on shaft 2, but rather than having a splined interengagement with shaft 2, plate 15 is provided with teeth 38' which slidably intermesh with mating teeth on screw member 10, so that plate 15 is constrained to rotate with screw member 10 and thus with shaft 3, while providing for axial displacement of member 10.

The starting control arrangement in FIG. 2 also differs somewhat from that shown in FIG. 1. The bore of pinion 2 is formed with splines 44 and the end of engine output shaft 1 is tubular and is formed with diametrically opposite apertures 45 each of which receives a ball 46. The movable armature 42 associated with energizing winding 40 is provided with a frusto-conical head 47 cooperable with the balls 46. When clutch coil 40 is de-energized, core 42 is to the right of the position shown in FIG. 2 so that balls 46 can move radially inwardly in their apertures 45. When coil 40 is energized, either by closure of switch S₁ or by closure of switch S₂, core 42 is moved to the position shown in FIG. 2 wherein balls 46 are forced into the splines 44 in the inner surface of pinion 2 to connect pinion 2 to rotate with engine output shaft 1. Otherwise, the arrangement operates in the same manner as described for FIG. 1.

Figure 3:
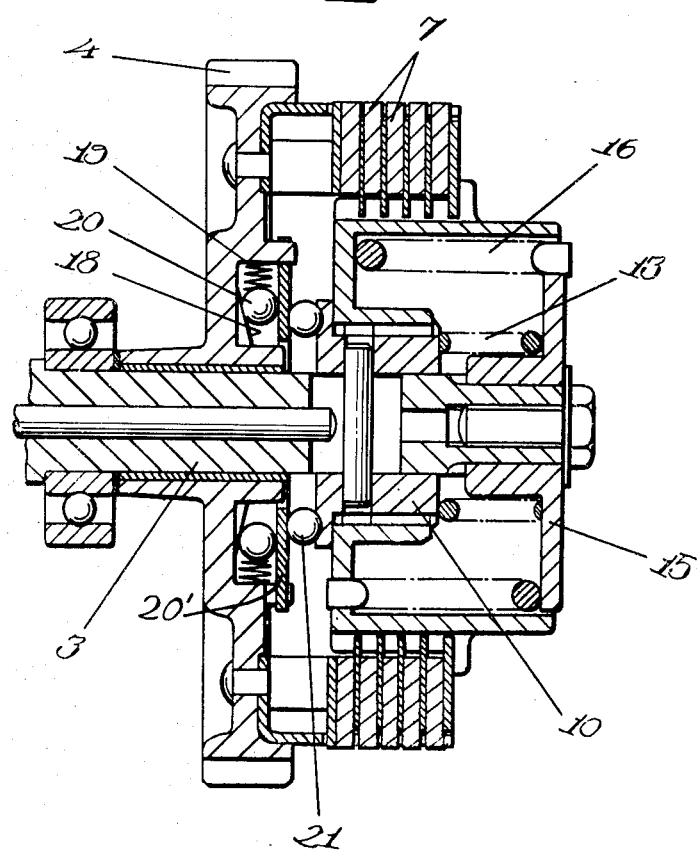

As previously stated, it is desirable to select the operating parameters in such a manner that displacment of screw member 10 will essentially balance the action of spring 16 when the vehicle is traveling at a substantially constant speed. As the retarding force under constant load is substantially proportional to the speed of the vehicle, it is most effective to increase the possible displacement of screw member 10 in accordance either with the speed of the engine or the speed of the vehicle. FIG. 3 shows one arrangement for accomplishing this.

Referring to FIG. 3, one face of drive gear 4 is formed with a concentric annular recess having an inclined surface 18 sloping away from screw member 10 in a radially outward direction. Balls 20 are arranged to engage inclined surface 18 and are biased radially inwardly by springs 19. The outer side of the annular recess is closed by an annular plate 20' which is engaged by balls 21 in a raceway on the facing or left surface of screw member 10. As the engine speed increases, the speed of gear 4 will increase and balls 20 will be displaced radially outwardly. This, in turn, will increase the effective displacement range of screw member 10 in a leftward direction as viewed in FIG. 2. Such displacement range increase will be directly proportional to the speed of gear 4 and thus to the r.p.m. of the engine.

Figure 4:
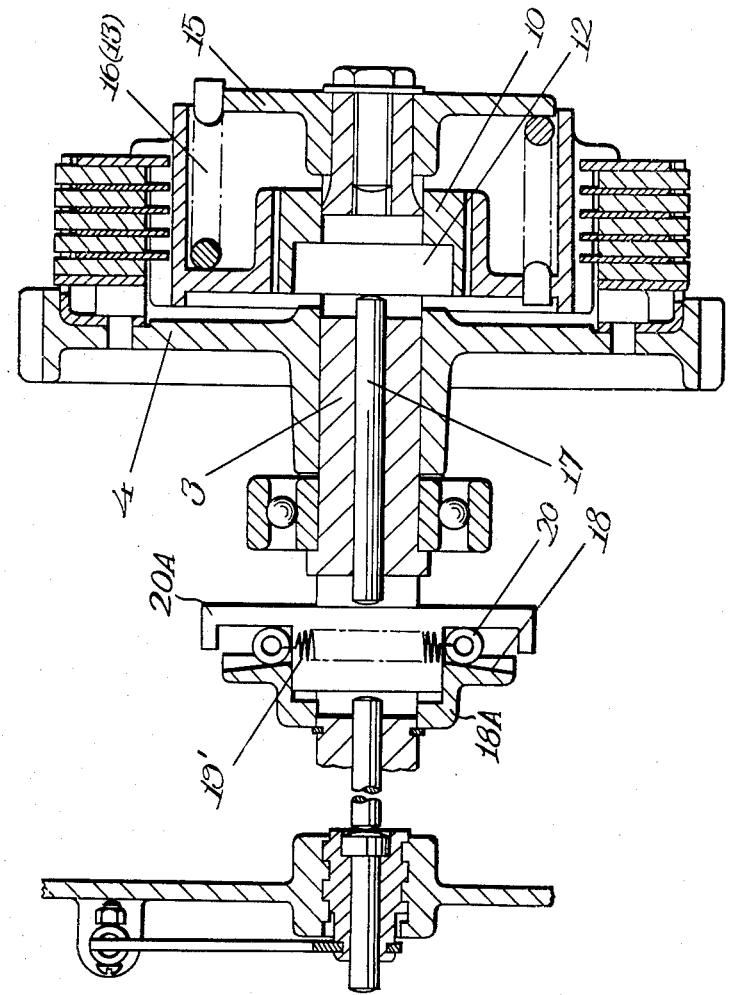

FIG. 4 shows an arrangement in which the inclined surface 18 is provided on a member 18A secured to rotate with output shaft 3, and the balls 20 are engaged with a second member 20A displaceable axially of output shaft 3 but secured to rotate therewith. Member 20A acts on the thrust rod 17 and thereby controls the effective position of the inner end of rod 17. In turn, this controls the effective displacement of screw member 10.

In each of the mentioned arrangements, the bias of compression spring 13 provides a component tending to move the balls 20 radially outwardly along the inclined surfaces 18. Such movement is counterbalanced by springs 19 or 19' and, if the bias of these springs is less than such component, the component will tend to move the balls in a centrifugal direction. In such case, the clutch may be so designed that a strong braking force acts on balls 20 and inclined surface 18 when subjected to this component, so that the outward movement of balls 20 may precede, by a little amount, the displacement of thrust screw 10 due to the load resistance. It is only during the movement of screw member 10 due to an acceleration retarding force that member 10 will be prevented from axial displacement. When the acceleration is completed, balls 20 will separate and will be balanced with the springs 19 or 19' only by the centrifugal force due to balls 20 per se. Spring 19 should be considerably stronger than the above-mentioned force component, and the load capacity of balls 20 should be made sufficiently large. However, as the centrifugal force is proportional to the square of the r.p.m., in order to make the action directly proportional to the r.p.m., the shape of the inclined surface 18 may be varied, as by curving it in such a manner as to taper rearwardly.

Figure 5:
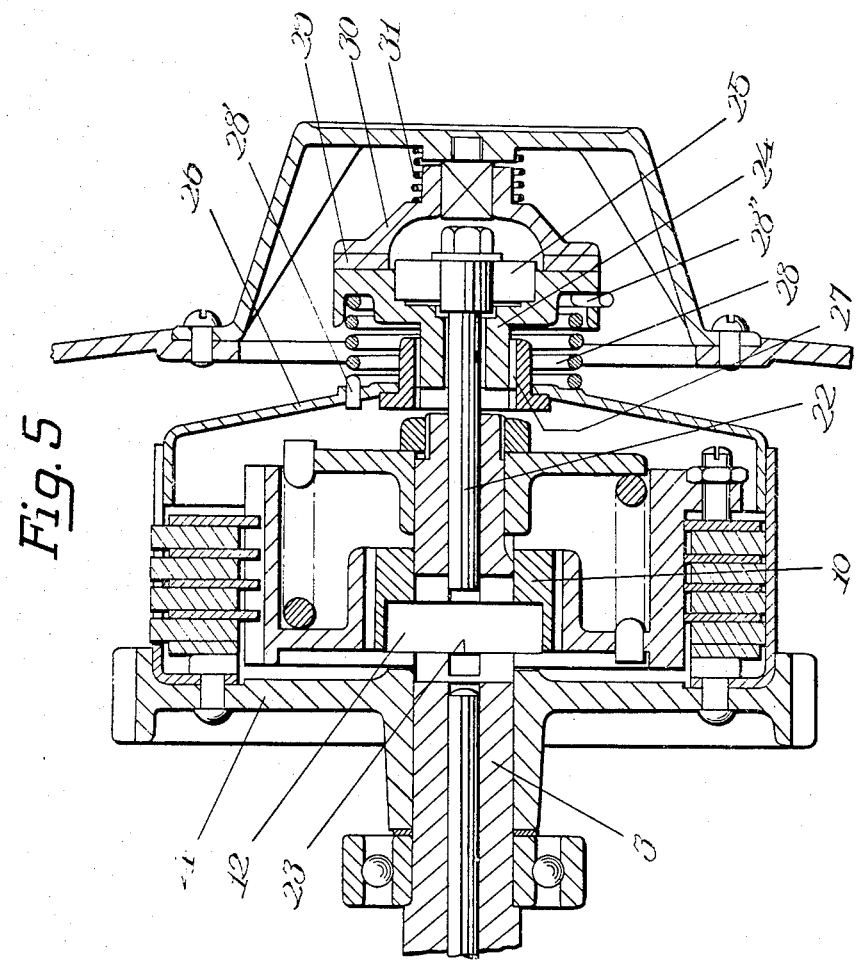

It is possible to control the range of displacement of screw member 10 in proportion to the r.p.m. of the engine without utilizing the centrifugal force principle. As shown in FIG. 5, an adjusting rod 22 is slidable through an axial bore in the righthand portion of shaft 3 and is formed with a stepped or hooked portion 23 engageable with key 12 so as to pull the key to the right upon movement of rod 22 to the right. An adjusting screw 24 is connected to rod 22, for conjoint axial displacement therewith, by means of an anti-friction bearing 25 permitting relative rotation of adjusting screw 24 and rod 22. Screw 24 is threaded into the central portion of an extended cap 26 of clutch housing 5, as by the interengaged threads 27.

The positions of rod 22, key 12 and screw member 10 will be controlled by the relative axial position of adjusting screw 24. The screw couple 27 is so designed that, when it is rotated in the driving direction of housing 5, adjusting screw 24 moves to the left. A torsion spring 28 has one end 28' connected to cap member 26 and a second end 28' connected to adjusting screw 24 so as to transmit rotation to screw 24. Adjusting screw 24 is biased into engagement with the lining 29 of a brake member 30 which is not rotatable, such biasing being effected by spring 31 engaged between the axially displaceable but non-rotatable brake member 30 and a closure cap.

When rotation of cap 26 is transmitted to screw 24, which is braked by brake member 30, spring 28 will be displaced in the rotation direction. The degree of displacement is substantially proportional to the r.p.m. of the engine. This will vary the degree of screwing of coupling 27 and will displace rod 22 to the left. This leftward displacement of rod 22 and thus of screw member 10 will be proportional to the r.p.m. of the engine.

With the arrangement of FIG. 5, the braking torque causes a heating of the brake lining and there is danger of overheating and excessive wear. Consequently, either a cooling means should be provided or the design should be such that excessive heat generation and excessive wear will not occur. The rotation of adjusting screw 24 with the resultant deformation of spring 28 can be controlled by other means. For example, if the oil circulating pump is connected to screw 24, a resistance corresponding to the engine r.p.m. will be provided to screw 24. If the braking force is small, a strong fluid resistance may be produced in the circulating pipe, or a generator may be operatively connected so that energy equal to the generated electric power may be used to brake adjusting screw 24 and a deformation in the rotation direction be imparted to spring 28.

Figure 6:
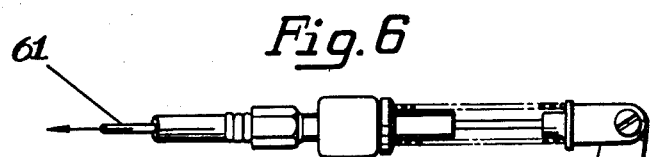
Figure 7:
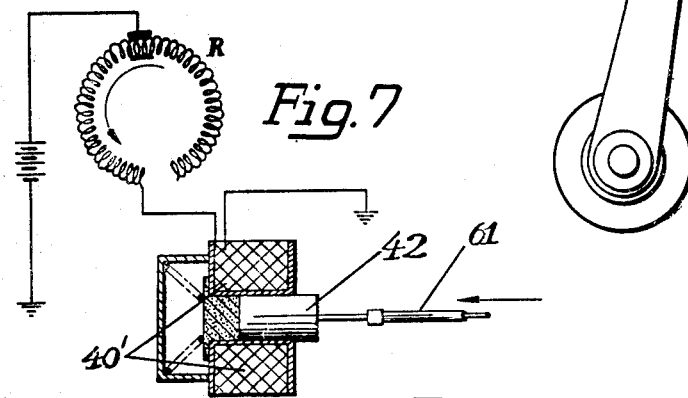

The degree of the displacement of thrust screw 10 may be controlled by a throttle lever or the like, and thus correspond to the throttle opening which is substantially proportional to the r.p.m. of the engine. Such arrangements are shown, for example, in FIGS. 4 and 6. If the control is effected by a manually operable device such as a throttle, it may be necessary to amplify the force electromagnetically as shown in FIG. 7. In such a case, if the operation is stepped, no great difference occurs. For example, and as shown in FIG. 7, the energization of a coil 40' controlling, through a movable core or armature 42 and a wire 61, displacement of the throttle, may be controlled by an adjustable resistance R whose resistance value is varied in accordance with the throttle position.

When drive spring 16 is not deformed at all, as when the engine is not running, the axial position of screw member 10 with respect to hub 9 will be fixed and, as the clutch disks are pressed together under constant pressure, they limit the actual position of hub 9. However, if by means of the speed responsive mechanisms just described, the adjusted position of screw member 10 when the engine is at a standstill is so selected as to be less than the aforementioned fixed axial distance relative to hub 9, the automatic clutch will remain disengaged. This has the great advantage of disengaging the clutch at the time of starting the vehicle. When the vehicle is started, acceleration results and thus the clutch begins to operate immediately. However, the engine torque just after starting of the vehicle will be so small that it will not be sufficient to deform spring 16 against the acceleration retarding force which can be infinite. Unless drive spring 16 is deformed, the clutch will not be disengaged and therefore the retarding force will be so high as to stall the engine. Consequently, it is best that the clutch disks be left disengaged until such time as the engine torque is sufficient to deform springs 16.

Accordingly, the adjustment of the position of screw member 10, with respect to the proper r.p.m. for obtaining the required torque, can be so selected that the clutch disks are barely in contact. Thereafter, smooth starting can be obtained by deflection of spring 16 to overcome the acceleration retardation. However, in an arrangement wherein balls 20 of relatively small mass are used so that the component of the spring 13 acting in a centrifugal direction is larger, it is not possible to maintain the clutch disks separated so that the clutch is engaged at the time of starting. In such case, and in order for engine to reach the proper r.p.m. for a clutch engagement, the clutch may be designed as shown in FIG. 8.

Figure 8:
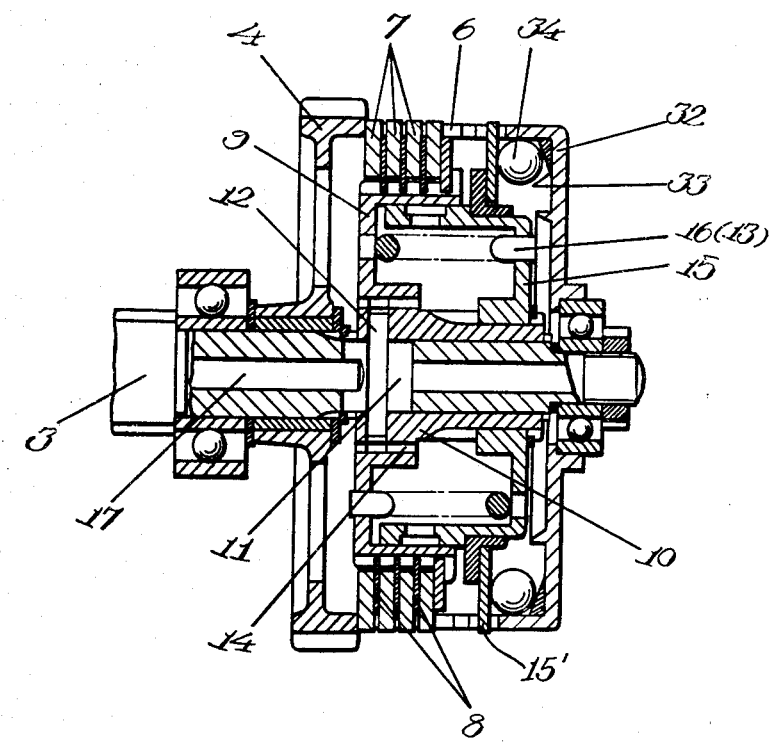

Referring to FIG. 8, drive plate 15 is splined directly to an extended hub of screw member 10, being limited in its movement axially to the right by a snap ring retainer. Hub 9 is also mounted on screw member 10 by virtue of the interengaging threads 14, and the spring 16, corresponding in function to the spring 13, is engaged between hub 9 and plate 15. Thus, the maximum axial separation of hub 9 and plate 15 is fixed, and spring 13 has an initial compression set to a desired value. When screw member 10 moves axially in a direction to separate the clutch disks, the clutch will be disengaged. The screw member 10 is normally adjusted so as to occupy this position.

A housing 32 is secured to rotate with clutch housing 5 and drive gear 4, and is formed with an inclined surface 33 whose height increases in a radially outward direction. Balls 34 are maintained in engagement with inclined surface 33, and also engage the back surface of drive plate 15 or an extension 15' of the latter. As drive gear 4 rotates, centrifugal force will be exerted on balls 34 and will result in an axial reaction on drive plate 15. This will cause, due to the hub 9, an increase in the pressure on the clutch disks so as to engage the clutch. When this pressure exceeds the bias of spring 13, the latter is compressed. The engine r.p.m. at which the balls 34 exert a pressure sufficient to engage the clutch may be selected to coincide with the r.p.m. required for exertion of sufficient engine output torque.

In the arrangement of FIG. 8, the centrifugal force responsive means, namely the balls 34 and inclined surface 33, is provided solely for assuring clutch engagement at a predetermined r.p.m. of the engine. The centrifugal force will progressively increase with the increase in the engine r.p.m. but, as the torque increases, spring 16 will be deflected so that the distance between the left end of screw member 10 and the drive plate 15 will become less and the radial displacement of the balls 34 will increase. This radial displacement of the balls 34 will increase. This radial displacement will also occur at a faster rate than can be obtained with a conventional utilization of centrifugal force, thus bettering the performance of the clutch.

Figure 9:
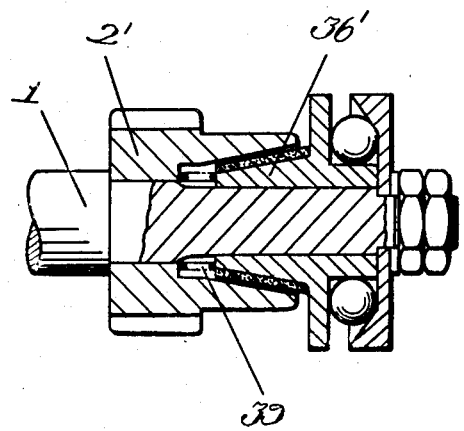

FIG. 9 illustrates a variation of the "start-up" means shown in FIGS. 1 and 2. In FIG. 9, the pinion 2' is formed with a hub extension having a frusto-conical central recess. The clutch member 36' corresponding to the clutch member 36 of FIG. 1, is formed with a frusto-conical hub having a friction lining engageable with the inner surface of the frusto-conical recess of pinion 2', and a spring 39 normally biases parts 2' and 26' axially apart. A centrifugal force responsive arrangement is associated with the member 36' to force the same into firm frictional engagement with pinion 2' as the engine r.p.m. attains a predetermined value.

It should be noted that the clutch member 36 or 36' could be operated by a wire connected to the throttle to engage the toothed parts 37 and 38 of FIG. 1 or the clutch 36' and pinion 2' of FIG. 9. In the centrifugal force type of operation, as a kick starting and push starting, a special reverse torque transmitting means is desirable and, in such case, the clutch can be electromagnetically operated by means of the kick switch $S_2$. It should be noted that it is possible for the connection to be made on the driven side instead of on the driving side, but in such case the centrifugal force cannot be utilized directly. The starting shocks will appear in form in which the motion of the mass from the driven plate to the connection is momentarily halted or absorbed by the spring 16.

It is of course, necessary that the clutch be disengaged during shifting of the transmission. For this purpose, it is only necessary so to connect screw member 10 to the shift lever as to disengage the clutch at the start of the speed shifting operation and to re-engage the clutch at the end of the speed shifting operation. The result of shifting up gears is the same as acceleration. Thus, no matter how hard a shift may be made, the clutch will absorb the shocks. The clutch life may be extended, and shocks may be prevented from being exerted thereon, by using a transmission in which the speed change is effected smoothly, such as an automatic transmission.

It is necessary that the load resistance, which is always present, be sensed, and the load resistance is different from the acceleration resistance, which latter is a resistance which can be added at any time to the load resistance. The acceleration resistance per se can be sensed by the clutch arrangement shown in FIGS. 2 and 10, in which the torque is transmitted by interengagement of slot 11, key 12 and splines 38'. In order for screw member 10 to move axially, there must be sliding of these engaging surfaces and the friction must be overcome by the force tending to move the screw member 10 axially. As a result, the movement of screw member 10 will lag slightly behind the movement of hub 9 due to the screw couple. As a result, the clutch disks will separate slightly to decrease the torque transmitted, and then will be again firmly engaged by movement of screw member 10. When drive gear 4 is accelerated, the acceleration resistance on driven shaft 3 will be so large that a reduction of the transmitted torque will always occur. The more rapid the acceleration, the greater is the tendency to reduce the transmitted torque. As the braking force for key 12 and spline 38 is due to the friction of the surfaces transmitting the torque, a braking force related to the magnitude of the acceleration resistance will be produced. The torque transmitted will be increased gradually until the acceleration of driven shaft 3 is completed, with the restoration of full torque transmission occurring initially at a slow rate and then at a faster rate. Thrust screw member 10 will easily follow the relatively slow load resistance changes, increasing with the increase in the r.p.m. of the engine. It is only at the time of quick acceleration that the thrust screw member 10 operates to effect a delayed response. As an alternative, axial displacement of screw member 10 can be delayed by a suitable slow release means such as an oil damper.

FIG. 10 illustrates a method of control involving the push rod 17 for effecting clutch disengagement and for providing for clutch re-engagement. With this arrangement, the time of clutch engagement can be made to coincide with a desired r.p.m. of the engine. Automatic operation can be obtained by providing that, when the desired r.p.m. is attained, the movement of push rod 17 is automatically made ineffective.

The force of spring 13 is so large that a manual lever is used to disengage the clutch, as previously mentioned. Shown at 48 is a pivoted bell crank lever which is engaged with push rod 17 at its short end 48' and has a connecting wire, rod, or the like secured to its long end 48" and connected to a clutch control lever (not shown). When lever 48 is rotated in the direction indicated by the arrow in FIG. 10, push rod 17 will be moved to the right with a small force and will disengage the clutch. In starting up using a conventional clutch, the clutch lever is gradually returned from the starting position as, if it is returned too rapidly, the engine will stall. It is substantially impossible, in practice, to automatically gradually return the clutch lever in a conventional clutch. In the present clutch, however, it is possible to quickly return the clutch lever.

Again referring to FIG. 10, an exciting coil 49 for an electromagnet is operatively associated with a movable iron core or armature 50 which, when attracted, will project into the path of movement of longer end 48" of lever 48 which has already been rotated in the direction of the arrow to disengage the clutch. Thus, lever 48 will be maintained in the clutch disengaging position as long as coil 49 is energized. When coil 49 is de-energized, armature 50 is biased to the retracted position by spring 51, releasing lever 48 so that the clutch will be re-engaged.

Energization of winding 49 is controlled by a switch $S_4$ which is closed until the engine attains a predetermined r.p.m. For example, switch $S_4$ may be operatively connected to a throttle grip 52 or may be operated by a centrifugal means on the engine output shaft. When a predetermined r.p.m. is attained, switch $S_4$ is opened and the clutch is re-engaged.

If lever 48 is operated to disengage the clutch while the engine is at a standstill, the clutch will be maintained disengaged. When the r.p.m. of the engine increases above a predetermined value, winding 49 will be de-energized and the clutch will be re-engaged. When the engine speed is above the predetermined minimum r.p.m., the clutch may be disengaged by operating lever 48 as often as desired, and the clutch will be re-engaged simultaneously with return movement of the clutch lever. Below the predetermined r.p.m., unless lever 48 is operated, the clutch will not be disengaged. A second switch $S_3$ is included in series with switch $S_4$, and is closed only when lever 48 has been swung fully in the direction indicated by the arrow so that winding 49 can be energized only when lever 48 is in the clutch disengaging position. It will be noted that a rod 53 is provided in abutment with a short arm of lever 48, and rod 53 is connected to the transmission mechanism and will operate rod 17 to disengage the clutch, in the same manner as rod 17 is operated by lever 48, the motion of lever 53 being transmitted through short arm 48' or lever 48 to rod 17.

In the arrangements described so far, the driven side or hub 9 is moved to press the clutch plates to engage the clutch. However, the clutch may be modified so that hub 9 is stationary and the driving side, such as clutch housing 5, may be displaced to press the clutch plates 7 and 8 into engagement. Such an arrangement is shown in FIG. 11.

Figure 11:
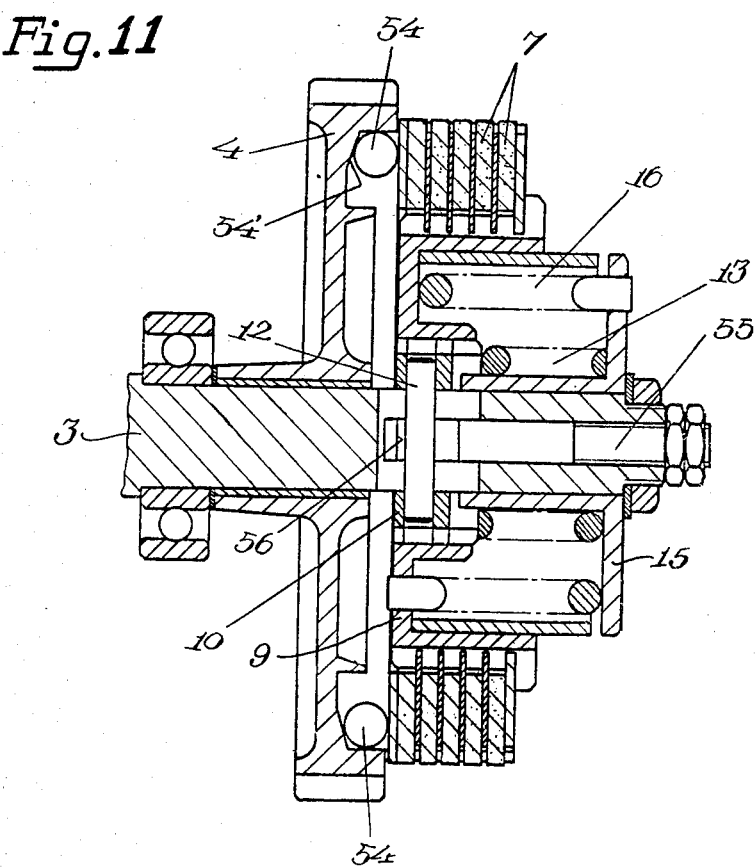

Referring to FIG. 11, centrifugal force can be utilized directly. Balls 24 are inserted between drive gear 4 and the endmost driving clutch disk 7, and are arranged to press the clutch disks into engagement by virtue of an inclined surface 54' provided on the inner face of drive gear 4 and increasing in height in a radially outward direction. The r.p.m. at which the clutch engaging force provided by balls 54 is effective to engage the clutch may be made to coincide with the desired r.p.m. of the engine required for starting. However, there is a sensitive relation between balls 54, spring 13, hub 9 and thrust screw member 10. As mentioned above, hub 9 has a fixed clutch engaging position prior to starting up of the engine. In the arrangement of FIG. 11, the limiting effect exerted by hub 9 in its initial position is exerted by preventing key 12 of screw member 10 from being operated by rod 17. In FIG. 11, instead of rod 17 a rod 55 extends slidably through an axial bore opening through the end of driven shaft 3 and is provided with a hooked portion embracing the key 12. Rod 55 is anchored to drive plate 15 which is biased away from screw member 10 by spring 13. Because screw member 10 is thus prevented from moving to the left, it would appear, at first glance, that there is a contradiction in the operating requirements of the clutch shown in FIG. 11.

However, the clutch engaging force exerted by balls 54 is a little greater than the bias exerted by spring 13 so that there is a clearance between hook 56 and key 12. Thus, in the position of parts shown in FIG. 11, screw member 10 is free to move axially through the extent of this clearance, so that the clutch will operate automatically. The parameters of the clutch are so selected that, when balls 54 are at their limit of outward movement, the required r.p.m. is obtained. When balls 54 are at their radially inner limit of movement, exactly the same operating conditions are present as are present in FIG. 10, so that starting of the engine can be effected with the clutch disengaged.

From the foregoing explanation, it would also appear, at first glance, that the clutch of FIG. 11 is the same as a regular centrifugal force actuated clutch but, in fact, the operation is entirely different. The operation is the same only in that, when the initial force exerted by balls 54 is rather small, the clutch plates will be pressed only lightly into contact so that only a small amount of torque will be transmitted and will gradually increase. However, with the transmission of the torque, spring 16 will be deflected so that screw member 10 will be no longer able to move axially, whereupon hub 9 will move axially and the clutch disks will be separated. Thus, the balls 54 can move further radially outwardly as hub 9 is displaced. As the balls move outwardly, the radius of revolution becomes greater and the centrifugal force will increase, the spring 16 will deflect more, and the radial outward movement of balls 54 will be accelerated so that the clutch will be re-engaged. Thus, there is substantially no shock in engaging the clutch. It will thus be apparent that actual starting is initiated by operation of thrust screw 10, but not by the centrifugal force.

The centrifugal force is proportional to the square of the r.p.m. and also the radius of the path of balls 54.

Thus, the centrifugal force will quickly increase the clutch engaging force by the multiplied action of the increasing r.p.m. and the increase in the radius of action of balls 54. The greater the angle of inclined surface 54′, the stronger this tendency will be. Consequently, if the clutch is so designed that the required clutch engaging pressure can be obtained at the desired r.p.m. of the engine, there will be substantially no engaging pressure at r.p.m.'s a little less than the desired r.p.m. and the clutch will remain disengaged.

Figures 12, 13:
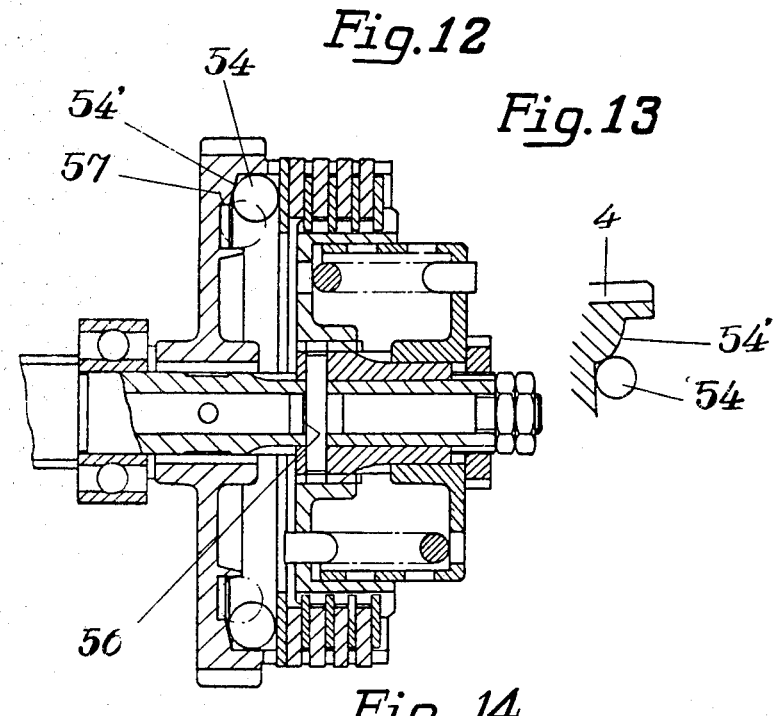
FIG. 13 illustrates a detail of FIG. 12 to an enlarged scale.

In order to increase the mentioned tendency, the clutch of FIG. 11 may be constructed as shown in FIG. 12. As illustrated in FIG. 12, a stepped annular recess 57 is formed at the inner end of inclined surface 54′ so that, in their radially inner position, balls 54 are engaged in annular recess 57. The component of the centrifugal force of balls 54 acting in the clutch engagement direction will be provided not by inclined surface 54′ but by the inclination of the curve of contact between balls 54 and stepped recess 57. The deeper the stepped recess 57, the smaller will be this component. This component will be given the value of cotangent $\theta$ within a range of 90° in the centripetal direction, from zero at the apex of the extension of the center of balls 54 in the centrifugal direction. At the start, this component will be small and its rate of increase will be small. In the latter half of the movement, the component will quickly increase and, as balls 54 move along inclined surface 54′, the required clutch engaging pressure will be quickly obtained.

For example, if the pressure exerted by spring 13 on the stepped part 56 of rod 55 is 25 kg., and the force required to operate drive spring 16 is reached at 2000 r.p.m., at 1500 r.p.m., balls 54 will still remain in stepped recess 57 and substantially no pressure will be exerted on the clutch disks. Near 2000 r.p.m., balls 54 will quickly override the edge of stepped recess 56 due to the quick increase of the component by the curved engagement surface between the balls and the stepped recess, and due to axial displacement of hub 9 by deflection of spring 16. At just this point, the pressure exerted by balls 54 will exceed the force of spring 13 and the clutch will be completely engaged. The quick outward movement of balls 54 along inclined surface 54′ will result from the compression of spring 13 and will increase the axial separation of key 12 and stepped recess 56. The clutch will be completely engaged and full torque will be applied to driven shaft 3. Furthermore, the braking force exerted on the thrust screw member 10 will be such that this member will not move substantially and will not compress the spring.

As only the deflection of the spring increases progressively, and hub 9 is moved axially, balls 54 will quickly move to their outer limiting position. Any further deflection will not be followed by balls 54, and will therefore effect a disengagement of the clutch. As acceleration increases and acceleration resistance decreases, the deflection will decrease. As the balls are wedged in position and hub 9 cannot move axially, the braking force will also decrease and screw member 10 will move axially because the axial component of the deflection force is stronger than the force of spring 13. When spring 13 is compressed, there will be a clearance between key 12 and recess 56.

Instead of providing the stepped recess 57 adjacent the inner end of inclined surface 54′, surface 54′ itself may be formed so that its angle of inclination in the axial direction gradually becomes less, as shown in FIG. 13. Consequently, the centrifugal component may be small at first, but may gradually increase. Thus, below a certain r.p.m., the clutch plates 7 and 8 will remain disengaged from each other. In actual operation, however, cases may occur wherein the clutch should be engaged during this time also. Such is the case when torque is transmitted reversely to the drive gear from driven shaft 3, and this occurs when the engine brake is used or when the engine is stopped, in case of push starting, or in the case of kick starting. If only the screw couple 14 is taken into consideration, screw member 10 will tend to be displaced in the driving direction with respect to hub 9 and therefore, as seen from hub 9, the displacement will be the same as would be made in the reversed driving direction. Thus, due to the screw couple, hub 9 will move positively in the clutch engaging direction. Therefore, in the case of reverse torque the clutch will be engaged. As a consequence, it is necessary that spring 16 should deflect in the reverse direction. On the driving side, particularly, after the clutch is disengaged, no retardation force is high enough thus to deflect spring 16, and therefore movement of hub 9 to disengage the clutch will not occur. As a result, in the event of a reverse torque, screw 10 and hub 9 may be rotated and displaced without deflecting spring 16.

Figure 14:
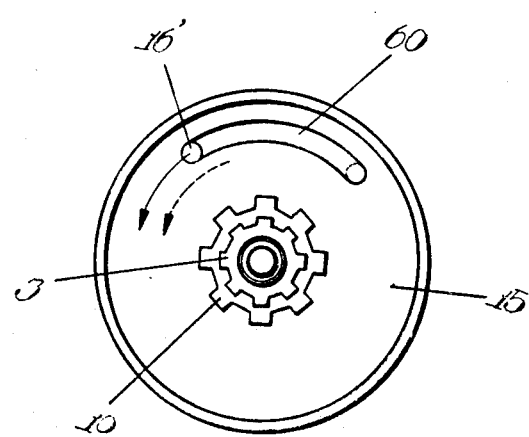
FIG. 14 is an elevation view of the clutch illustrating a modified arrangement for connecting a spring to a clutch element.

In the forward direction, torque is transmitted to screw member 10 or counter shaft 3 from sleeve hub 9 through spring 16. It is possible to make the reverse torque ineffective by providing an idling or freeing means about the rotationally displaced parts and compensating for the stroke of the hub 9. It is easy to fit such a means in the connection between hub 9 and spring 16, in the connection between spring 16 and plate 15, at the connection between plate 15 and screw 10, or in plate 15 itself. For example, and as shown in FIG. 14, an arcuate slot 60 may be provided in driving plate 15, and the end 16′ of drive spring 16 can be engaged therein. In the forward drive, or positive, torque direction, indicated by the solid line arrow in the drawing, spring 16 will drive plate 15 directly. During reverse torque, indicated by the dotted line arrow in FIG. 14, drive plate 15 can rotate freely until end 16′ of spring 16 comes to the opposite end of acruate slot 60, and therefore hub 9 will move axially to engage the clutch. After the clutch is engaged, if spring 16 is still free, a greater force than necessary will be applied to the screw couple 14 and the clutch disks. It is therefore desirable that the length of slot 60 be properly selected so that, for more than is necessary, the torque may be transmitted by spring 16.

While specific embodiments of the invention have been shown and described in detail to illustrate the application of the principles of the invention, it will be understood that the invention may be embodied otherwise without departing from such principles.

What I claim is:

1. An automatic clutch mechanism for transmitting driving torque from a driving shaft to a driven shaft, said clutch mechanism comprising, in combination, a driving member rotatable by the driving shaft; a driven member fixed to rotate with the driven shaft; a thrust screw slidable coaxially of the driven shaft and secured to rotate therewith; a sleeve member coaxial with the driven shaft and having a hub threadedly engaged with said thrust screw, for relative axial and angular displacement of said screw and said sleeve member; a multiple disk friction clutch coaxial with said driving member and said sleeve member and including driving disks fixed to rotate with said driving member and driven disks fixed to rotate with said sleeve member, said driving and driven disks being in alternation axially of said friction clutch and said disks being relatively displaceable axially; spring means, including a torsion spring, coaxial with said driven member, said thrust screw and said sleeve member, and effective to bias said thrust screw and said sleeve member axially away from said driven member, said sleeve member, under the axial bais of said spring means, pressing said clutch disks into engagement; said torsion spring having respective opposite ends anchored to said driven member and to said sleeve member, and normally constraining said driven member to rotate in substantially synchronism with said sleeve member; said torsion spring, when the effective counter torque due to load and acceleration forces on the driven shaft exceeds the effective driving troque on the driving shaft, providing for angular lag of said driven member relative to said sleeve member; the direction of the threaded interconnection of said thrust screw and the hub of said sleeve member being such that said sleeve member, during such angular lag, is displaced axially toward said driven member to decrease the pressure on said clutch disks, with simultaneous movement of said thrust screw axially away from said driven member and in a clutch disk pressure increasing direction; said angular lag decreasing as said effective counter torque and said effective driving torque approach equality; and control means operatively associated with said thrust screw and operable to limit such axial movement of said thrust screw away from said driven member.

2. An automatic clutch mechanism, as claimed in claim 1, in which said control means comprises centrifugal force means operable responsive to the angular velocity of at least one of the driving and driven shafts.

3. An automatic clutch mechanism, as claimed in claim 1, in which said control means comprises throttle means operatively associated with the driving shaft and a rod connected to said throttle means and extending coaxially through the driven shaft, said rod being displaceable axially of the driven shaft for abutment of its inner end with said thrust screw to limit such movement of said thrust screw axially away from said driven member in accordance with a setting of said throttle.

4. An automatic clutch mechanism, as claimed in claim 1, in which said control means comprises a non-rotatable brake member, a rotatable brake member rotatable coaxially relative to the driven shaft, means biasing said brake members into engagement, an operating member extending coaxially relative to the driven shaft and fixed against axial displacement relative to said rotatable brake member, and threadedly interengaged means connecting said rotatable brake member and said driving member and effective to displace said rotatable brake member axially upon occurrence of such angular lag to displace said operating member axially; said operating member having a portion disposed in the path of axial displacement of said thrust screw.

5. An automatic clutch mechanism, as claimed in claim 1, including centrifugal force responsive means interposed between said driving member and said friction clutch and cooperable with said sleeve member to press said clutch disks together with a pressure corresponding to the angular velocity of said driving member.

6. An automatic clutch mechanism, as claimed in claim 1, in which said control means includes friction means operatively associated with said thrust screw and providing a predetermined frictional resistance to movement of said thrust screw axially away from said driven member.

7. An automatic clutch mechanism, as claimed in claim 1, in which said spring means is effective to bias said thrust screw and said sleeve means for conjoint rotation in the driving direction.

8. An automatic clutch mechanism, as claimed in claim 1, including a first clutch element fixed to rotate with the driving shaft; a second clutch element in continuous driving engagement with said driving member; and clutch element engaging means effective, responsive to attainment of a predetermined r.p.m. of the driving shaft, to interengage said first and second clutch elements.

9. An automatic clutch mechanism, as claimed in claim 8, in which said clutch element engaging means comprises electromagnetic means.

10. An automatic clutch mechanism, as claimed in claim 8, in which said clutch element engaging means comprises centrifugal force responsive means operable in accordance with the angular velocity of the driving shaft.

11. An automatic clutch mechanism, as claimed in claim 3, including latch means operatively associated with said control rod and effective to maintain the same in a predetermined relation with respect to said thrust screw; electromagnetic means operable, when energized, to activate said latch means; an energizing circuit for said electromagnetic means; and normally open switch means in said energizing circuit closed responsive to a predetermined r.p.m. of the driving shaft.

References Cited by the Examiner

UNITED STATES PATENTS

| 1,434,970 | 11/22 | Taylor | 192—54 X |
| 1,559,527 | 10/25 | Spase | 192—55 X |
| 1,985,662 | 12/34 | Lansing | 192—103 X |
| 2,151,724 | 3/39 | Wengel et al | 192—56 X |
| 2,154,419 | 4/39 | Cotterman | 192—103 X |
| 2,203,117 | 6/40 | Whatmouth | 192—52 X |
| 2,419,890 | 4/47 | Freeborn | 192—105 |
| 2,998,114 | 8/61 | Altmann | 192—52 |

FOREIGN PATENTS

| 391,787 | 4/33 | Great Britain. |
| 86,757 | 11/57 | Netherlands |

DON A. WAITE, *Primary Examiner.*

THOMAS J. HICKEY, DAVID J. WILLIAMOWSKY,
*Examiners.*